Sept. 15, 1931.     F. H. BELL     1,823,525
APPARATUS FOR SEALING LAMINATED GLASS
Filed May 1, 1928
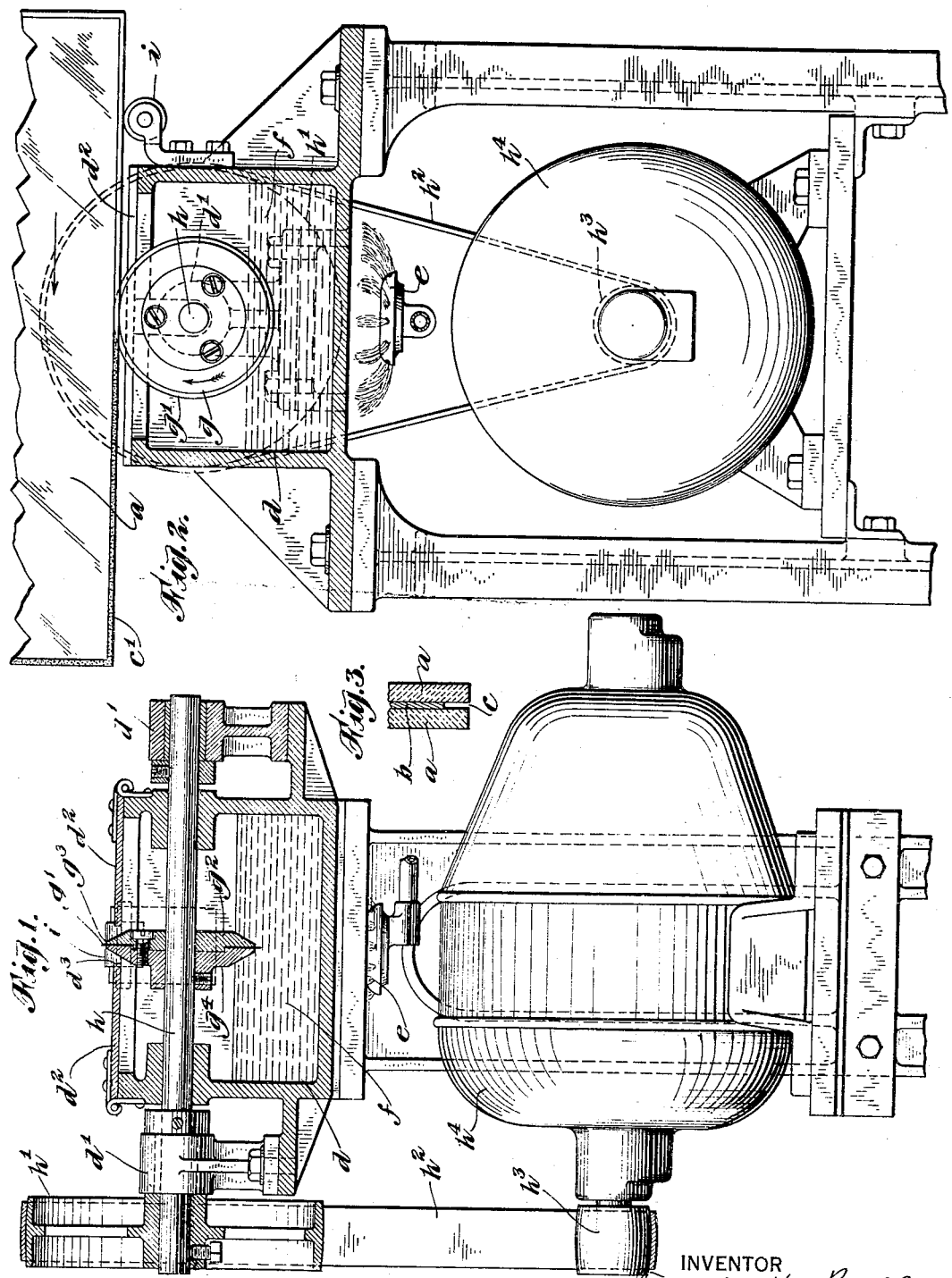

Patented Sept. 15, 1931

1,823,525

UNITED STATES PATENT OFFICE

FRANK H. BELL, OF FERNDALE, MICHIGAN, ASSIGNOR TO TRIPLEX SAFETY GLASS COMPANY OF NORTH AMERICA, OF NEW YORK, N. Y., A CORPORATION OF DELAWARE

APPARATUS FOR SEALING LAMINATED GLASS

Application filed May 1, 1928. Serial No. 274,185.

In the manufacture of laminated glass, which consists of sheets of glass with an interposed sheet of celluloid or its equivalent non-brittle material, strongly adherent to the glass on both sides, it is sometimes found desirable to seal the edges of the compound sheet in order to prevent the penetration of moisture or air between the sheets of glass. This sealing is sometimes effected by the application of a coat of varnish to the edge of the compound sheet, but this does not prove satisfactory in practice. It has also been accomplished by clearing out the space between the sheets of glass for a slight depth at the edge and filling the sealing slot so formed with a sealing material or compound which has no action upon the celluloid or other non-brittle material and effectually prevents entrance of air or moisture or anything else. Such sealing has been accomplished effectively heretofore by presenting the edge of the compound sheet to a nozzle through which the sealing material, heated so that it will flow readily, is forced, but this mode of sealing is relatively slow and sometimes is accompanied by a smearing of the outer surfaces of the glass with the sealing material. It is the object of the present invention to enable this mode of sealing, that is, the filling of the sealing slot to be carried out more rapidly than heretofore, thereby reducing the cost of production, which is a material consideration in quantity production. The invention consists in an improved apparatus for the introduction of the sealing material into the sealing slot the apparatus comprising a rotating disc which dips at one edge into the sealing material, maintained in a fluid condition, and at its other edge enters the sealing slot carrying with it and leaving in the slot a sufficient quantity of the sealing material to fill the slot. Means are provided for supporting the compound sheet in proper relation with the disc and means are also provided for maintaining the sealing material at the proper degree of fluidity. The invention will be more fully explained hereinafter with reference to the accompanying drawings in which it is illustrated and in which:

Figure 1 is a view partly in elevation and partly in section of a form of apparatus which embodies the invention.

Figure 2 is a view of the same, partly in elevation and partly in section, as seen from the point of view at right angles to that of Figure 1, a portion of the compound sheet of glass to be sealed being also shown.

Figure 3 is a detail view in section and on a larger scale illustrating the formation of the compound or laminated sheet.

The compound or laminated sheet which is to be sealed is shown as consisting of two sheets $a$ of glass, with an interposed sheet $b$ of celluloid or equivalent non-brittle material which, by methods not necessary to be described herein, is made strongly adherent on both sides to the glass. When this compound or laminated sheet is in readiness for sealing it has at its edge, between the two sheets of glass, a recess $c$, which is called for convenience a sealing slot, formed by the omission or removal of the intersheet $b$ for a slight depth, possibly one-quarter of an inch, and quite narrow, depending upon the thickness of the celluloid or other non-brittle sheet $b$.

The apparatus for sealing the compound sheet at its edge by the filling of the sealing slot with a suitable sealing material, comprises a suitable pot $d$ to contain the sealing material in a fluid condition. As shown, a gas burner $e$ may be located below the pot for the purpose of heating the pot and its contents and thereby keeping the sealing material, indicated at $f$, in a sufficiently fluid condition. A sealing disc $g$, which may be composed of a metal ring $g^1$ sufficiently thin to enter readily the sealing slot $c$ and supporting members $g^4$ and $g^2$ which clamp the thin collar $g^1$ between them, afford supporting shoulders $g^3$ at their edges, and are secured together upon a shaft $h$. The latter is shown as having secured thereon a belt pulley $h^1$ driven by a belt $h^2$ from a pulley $h^3$ on the shaft of a suitable motor $h^4$. The shaft $h$ is mounted in suitable bearings $d^1$ supported with the pot $d$. Also supported with the pot $d$ is a roller $i$, upon which, and upon the shoulders $g^3$ above mentioned, the compound or laminated sheet may be supported during the operation of filling the sealing slot. The pot $d$ may be provided with hinged covers $d^2$ which are cut out as at $d^3$ to permit the sealing disc to project somewhat above the covers.

In the operation of the apparatus the laminated sheet to be sealed is supported upon the roller $i$ and upon the shoulders $g^3$ of the filling disc in such position that the edge of the thin plate $g^1$ enters the sealing slot $c$ and the sheet is then moved longitudinally in a direction opposite to the direction of rotation of the sealing disc $g$, the sealing material $f$ being at the same time transferred from the pot to the sealing slot and filling the same completely, as indicated at $c^1$ in Figure 2. The sealing material is of such character that it hardens quickly as its temperature is reduced by contact with the relatively cool glass, so that it has no tendency to run out of the sealing slot. It will be seen that the operation of sealing, as carried on with this apparatus, can be effected with great rapidity and with the serve of a single operative.

I claim as my invention:

An apparatus for filling with sealing material the sealing slot at the edge of laminated glass which comprises a pot for the sealing material, a roller support for the glass at one side of the pot a rotating disc arranged to dip into the sealing material and having a thin edge to enter the sealing slot, the sealing disc having shoulders at the sides of the thin edge to support the glass at the level of the roller support, and means to rotate the disc independently of the movement of the glass.

This specification signed this 20th day of April, A. D. 1928.

FRANK H. BELL.